United States Patent [19]
Haan et al.

[11] Patent Number: 6,125,686
[45] Date of Patent: Oct. 3, 2000

[54] IMPACT MEASURING DEVICE FOR DELICATE AND FRAGILE ARTICLES

[75] Inventors: Thomas Haan, Bridgetown; Wayd McNally, Scotchfort, both of Canada

[73] Assignee: PEI Innovations Inc., Cardigan, Canada

[21] Appl. No.: 09/163,325

[22] Filed: Sep. 30, 1998

[51] Int. Cl.[7] .................................................. G01M 7/00
[52] U.S. Cl. ........................................ 73/12.09; 73/12.04
[58] Field of Search ................................ 73/12.01, 12.02, 73/12.04, 12.05, 12.06, 12.07, 12.09

[56] References Cited

U.S. PATENT DOCUMENTS

| | | |
|---|---|---|
| 3,656,352 | 4/1972 | an .............................................. 73/492 |
| 4,088,324 | 5/1978 | Farmer . |
| 4,114,450 | 9/1978 | Shulman . |
| 4,745,564 | 5/1988 | Tennes . |
| 4,775,948 | 10/1988 | Dial . |
| 4,829,812 | 5/1989 | Parks et al. ............................ 73/12.04 |
| 5,426,595 | 6/1995 | Picard . |
| 5,811,680 | 9/1998 | Galili et al. ............................. 73/579 |

*Primary Examiner*—Max Noori
*Attorney, Agent, or Firm*—McFadden, Fincham

[57] ABSTRACT

Apparatus is provided for measuring and displaying impact received by fruit and vegetables during processing. An impact measuring module, having the approximate configuration of an individual fruit or vegetable article, incorporates impact measuring means and data transmitting means. The module is adapted for emplacement within a batch of fruit or vegetables, and as it experiences impact or movement, electrical impulses are transmitted to a remote receiving unit. The receiving unit incorporates data display means to visually display the impact data stream. The receiving unit may also incorporate data recording means and event marker means to permit a user to correlate visually observed events within the processing operation with the data stream recorded by the receiving unit. The data stream may be recorded within the receiving unit, for downloading into a computer.

17 Claims, 3 Drawing Sheets

IMPACT MEASURING DEVICE FOR DELICATE AND FRAGILE ARTICLES

FIELD OF THE INVENTION

The present invention relates to a device for measuring the impact experienced by fragile or delicate articles such as fruit and vegetables during bulk processing and handling, and in particular to a device having the approximate configuration of a selected fruit, vegetable or other article, for positioning within a batch of the selected articles. The device transmits to a remote receiving unit data relating to the impact and movement experienced by the device, correlating with the impact experienced by the articles.

BACKGROUND OF THE INVENTION

It is desirable to generate data relating to the impact and movement experienced by fragile articles such as glassware or fruit and vegetables during bulk processing or handling. By way of example, processing of potatoes involves a number of steps, each of which potentially exposes the potatoes to damaging impact. In order to optimize production of undamaged potatoes, it is desirable for the operator of processing equipment to have available data relating to the impact experienced by the potatoes as they are being processed. This may be accomplished by placing within a batch of potatoes being processed a device having the general configuration and weight of a typical potato, and which incorporates a means to measure and record the impact received by the device. The assumption is made that this correlates with the impact experienced by the individual potatoes. It will be seen that although the example of potatoes is given, such an article may be adapted for use with a wide variety of loose articles. In typical prior art devices, the module would then be retrieved at a desired stage and the recorded impact data analyzed.

Examples of devices of this nature include U.S. Pat. No. 4,745,564 B. R. (Tennes) which relates to an impact detection device mounted in a casing resembling the shape of a potato. U.S. Pat. No. 5,426,595 (Picard) relates to a portable device for detecting and recording shocks capable of affecting objects during transportation and/or handling.

It is desirable in such a device that the user can precisely correlate the impact data measured by the device with a particular stage in the processing operation. For this purpose, the operator should have some means to record in the data stream generated by the device the occurrence of a specific event or moment in time. It is also desirable that an operator be able to view the impact data in real time, i.e., as the articles are being processed. These objectives may be achieved by providing a device wherein the impact data measured by an impact measuring module is transmitted to a remote unit, as the data is being generated for both real-time viewing and recording. The recorded data may be down-loaded to a computer for further data processing and/or storage. The remote unit may also incorporate a means for the viewer to insert event markers or other information within the recorded data stream, in order to precisely correlate the impact data with events occurring during the processing operation.

A further desirable feature is to provide an impact measuring module that may be miniaturized sufficiently to be placed within a mass of objects, wherein the individual objects are relatively small such as typical potatoes. The use of a remote data storage and display unit reduces the functions required of the module and its power requirements. This permits a reduction in the size of the impact measuring module.

SUMMARY OF THE INVENTION

It is an object of the present invention to provide an apparatus capable of measuring the impact received by an individual fruit, vegetable or other fragile or delicate article during bulk processing, and to transmit the impact data to a remote receiving unit for real time viewing and/or recording by an operator. It is a further object to provide in such a device a means for recording within the data stream an event marker or other information generated by the operator.

In accordance with these objects, the present invention comprises in its broadest aspect an impact measuring module for insertion within a batch of objects. The module has the approximate configuration of a selected article such as a selected fruit or vegetable. A remote receiving unit receives data transmitted by the module. The module comprises a power source such as a battery; impact measuring means, which may comprise an accelerometer, for measuring impact and movement experienced by the module and generating a data stream corresponding to the impact and movement experienced by the module; and wireless data transmitting means for transmitting the data stream to the remote receiving unit. The receiving unit comprises a power source; data receiving means for receiving data transmitted by the impact measuring module; and data display means for displaying data in "real time", i.e., as the articles are being processed.

The remote receiving unit may further comprise data recording means for recording and storing the data stream, for example by means of a random access memory chip; data downloading means for downloading the stored data into a computer; and user input means to permit a user to enter information, such as an event marker, into the recorded data stream. The impact measuring module may further comprise a supporting circuit linking the power source, the impact measuring means and the transmitter.

In a preferred embodiment, the impact measuring module is adapted for use in the processing of potatoes and has the approximate configuration and weight of a typical potato.

The invention further comprises a method for measuring impact received for fragile or delicate articles during bulk processing or handling and displaying the resulting date. The method comprises the steps of providing an impact measuring module of the type described above, positioning the module amongst selected articles having the approximate size, weight and general configuration of the module; transmitting data received by the module as a result of movement of the module to a remotely positioned receiving unit and displaying the resulting data with the receiving unit.

The method optionally comprises the further steps of measuring movement within the module by means of an accelerometer; recording and storing the resulting data within the receiving unit; providing within the stored data stream one or more event markers at selected moments in time; and downloading the stored data into a computer.

The present invention will now be described by way of a preferred embodiment.

DETAILED DESCRIPTION OF THE PREFERRED EMBODIMENT

Figure 1:
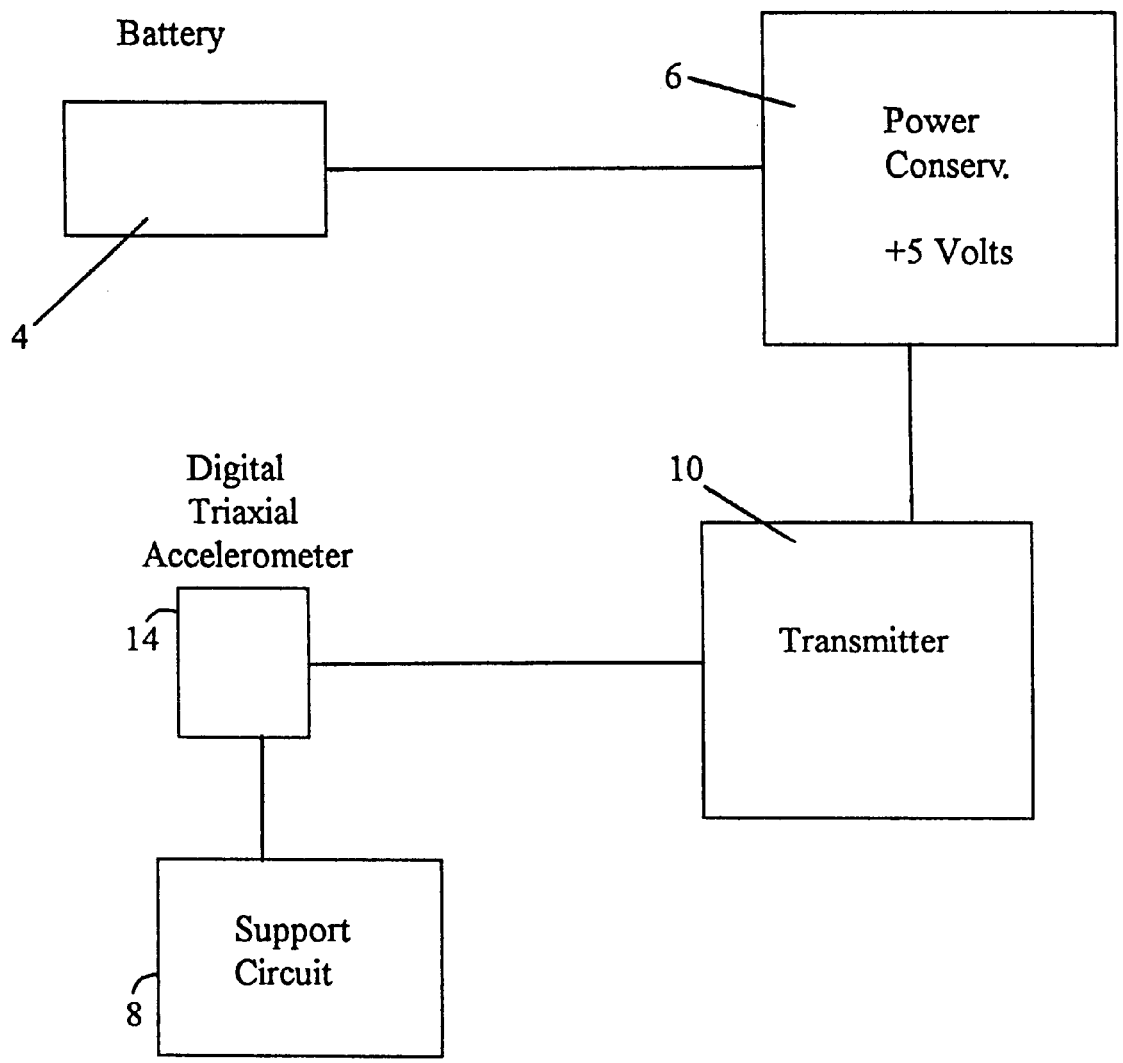
FIG. 1 is a block diagram showing the components of the impact measuring module of the present invention.

Referring to FIG. 1, the impact measuring module 2 is powered by a battery 4, the output of which feeds a power conserving circuit 6. The circuit 6 supplies current to a wireless transmitter, conveniently a radio transmitter 10 and a digital or analog triaxial accelerometer 14 for measurement of impact in any direction. The accelerometer conveniently comprises a conventional commercial product having sufficient shock resistance and sensitivity to satisfy the requirements of the invention. An accelerometer support circuit 8 is linked to the accelerometer and interfaces the battery and the accelerometer. The accelerometer generates electrical impulses in response to movement experienced by the module, and transmits these impulses to the transmitter. The transmitter in turn transmits at any convenient frequency suitable for transmitting the signals generated by the accelerometer. It will be seen that wireless transmission at non-radio frequencies may be employed, although radio frequency transmission appears to be the most convenient.

Figure 2:
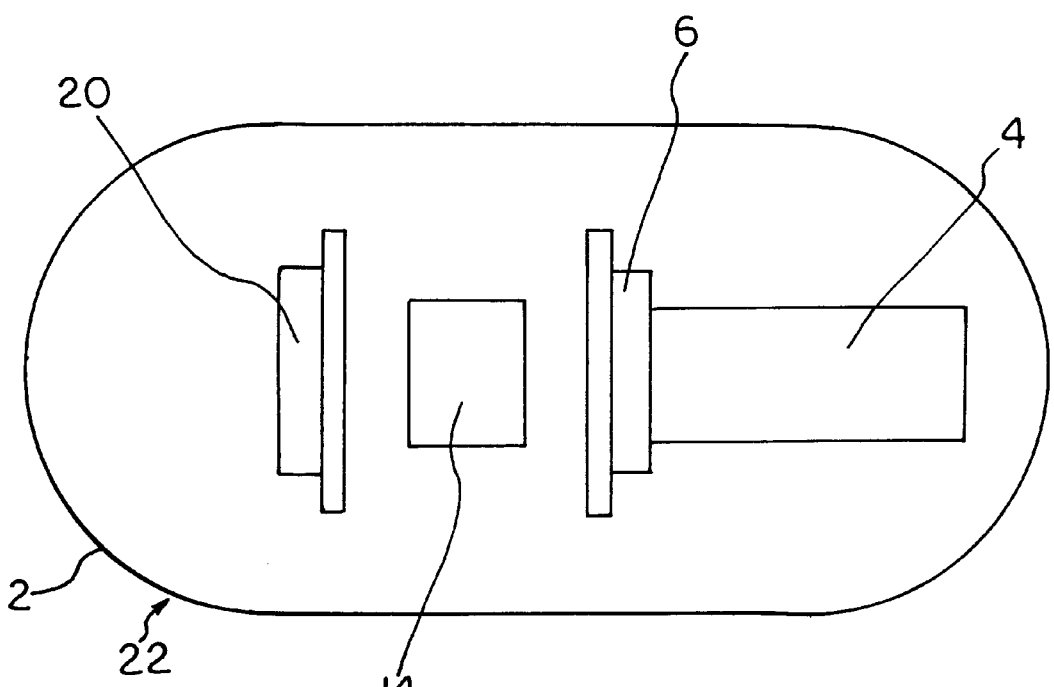
FIG. 2 is a schematic illustration of the impact measuring module.

As seen in FIG. 2, the module 2 is contained within a generally oblong housing 22, fabricated from high impact plastic, polyurethane, or other suitably durable and rigid material. Depending on the weight of the internal components and the size of the housing, additional weights, not shown, may be mounted within the housing to permit the weight of the module to match that of a typical potato. The impact measuring module is preferably brightly coloured, for example with fluorescent dye, in order to permit the module to be readily retrieved.

Figure 3:
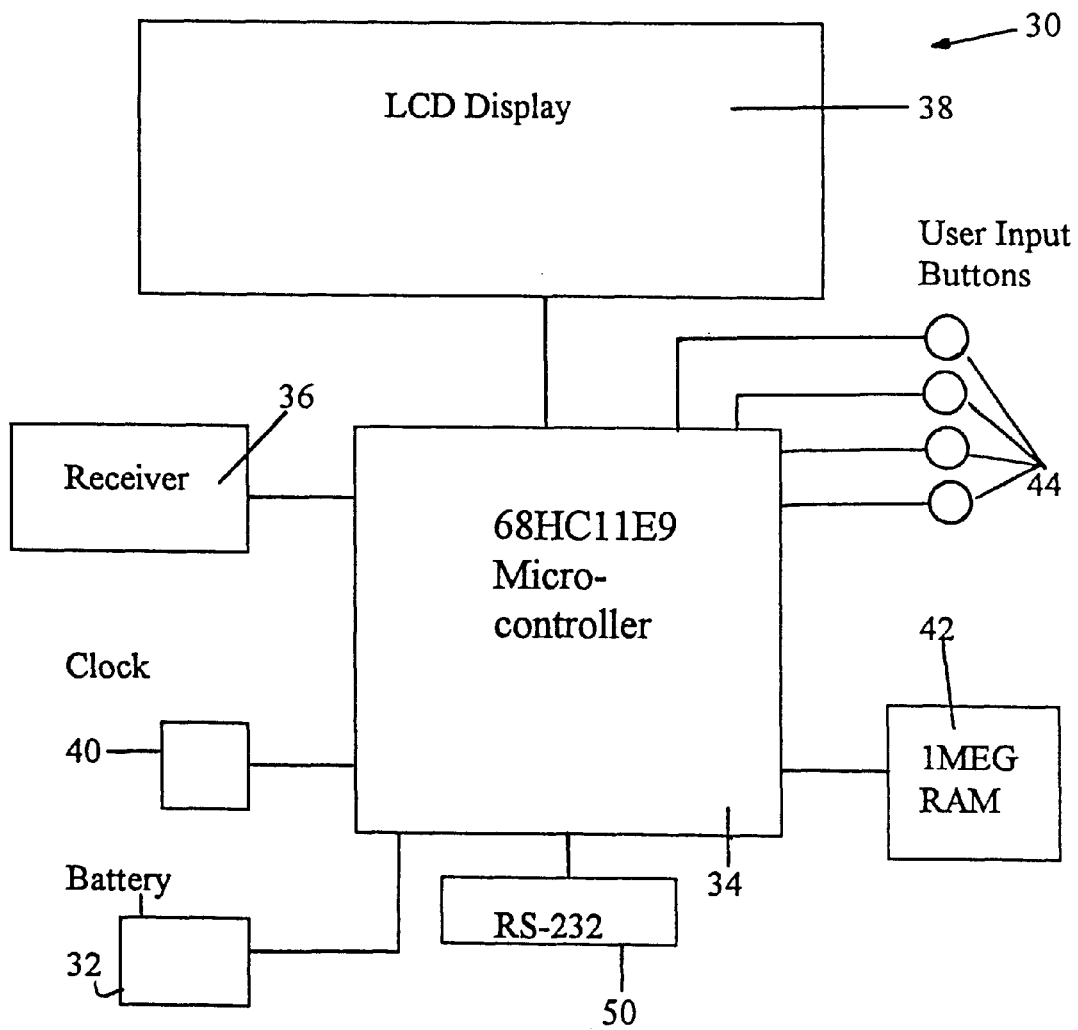
FIG. 3 is a block diagram showing the components of the remote receiving unit.

Turning to the remote receiving unit 30 shown in diagrammatic form in FIG. 3, the unit is powered by a second battery 32, which supplies power to a microcontroller 34. The controller 34 in turn is linked to a receiver 36 adapted to receive transmissions at the radio frequency of the transmitter 10. The data stream received by the receiver may be viewed on an LCD display 38, which displays the data stream in real time, as received by the receiver, in the form of a continuous graph. The microcontroller further includes a clock 40 which permits the data stream to be correlated with the time or elapsed time. The data stream is further transmitted from the controller 34 to a random access memory chip 42, which may consist of a RAM having a one meg capacity. The microcontroller is further controlled by various user input means, by means of which an operator may contribute information to the data stream recorded within the data storage means. The user input means includes event marker buttons 44, by means of which the user can record in the data stream the occurrence of a particular event. This may be used, for example, in a situation where the operator observes the potatoes undergoing a particular operation, and wants to record in the data stream the moment at which this occurred. The event markers may comprise a time marker that can record a particular time or elapsed time. During later viewing, the impact data can be correlated with the event marker data.

The remote receiving unit 30 further comprises a data downloading port 50 for downloading the data stream recorded in the random access memory into a computer, not shown. The port may comprise a standard RS-232 port, which can be linked by cable to a computer.

Figure 4:
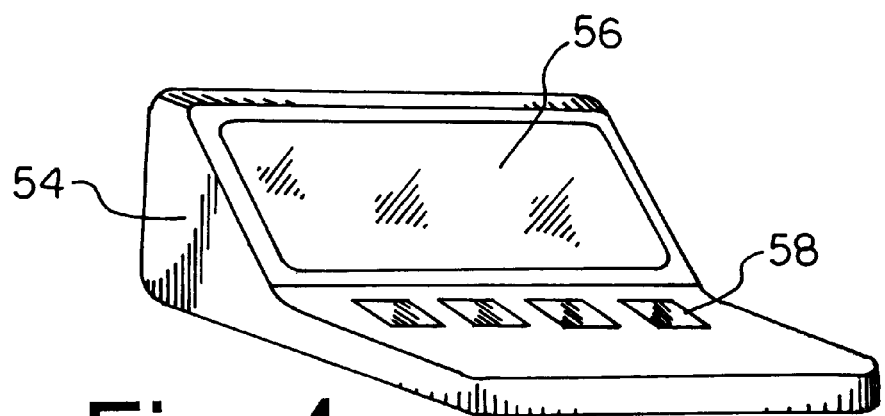
FIG. 4 is a perspective view of the remote receiving unit.

Referring to FIG. 4, the remote receiving unit comprises a case 54 that may be hand-held by the operator, having a viewing screen 56 and an array of function buttons 44. The function buttons each permit the operator to record an event.

It will be understood that the impact measuring module housing may comprise any desired size and configuration, depending on the fruit, vegetable or other article selected. References herein to the configuration of the module are understood to relate to the approximate size and shape of any selected article. Additional examples include modules having the approximate configuration and weight of an average apple, tomato or orange.

In use, the impact measuring module is positioned amongst selected articles having the size, weight and general configuration of the module. For example, if the selected articles comprise a particular grade, variety and approximate size potatoes, the module will be selected to have an approximately similar size, weight and general configuration as an average such potato. It will be understood that a module may readily be sized for appropriate usage with a variety of fruits, vegetables or other articles. As the articles are processed, the movement experienced by the articles will be transmitted to the module by virtue of the module's being positioned amongst the articles and being in contact with one or more articles at any given time. As the module experiences impact or other movement, the accelerometer generates electrical impulses, which in turn are transmitted to the remote receiving unit. The remote receiving unit accordingly displays the resulting data in "real time", i.e. as the movement is experienced by the impact measuring module. The operator may simply view the data or may optionally program the receiving unit to record the data. Further, the operator may record event markers within the data stream recorded by the receiving unit. The operator may then download the recorded data along with the optionally recorded event markers into a computer for further storage and/or analysis.

Although the present invention has been described by way of a preferred embodiment, it will be apparent to a person skilled in the art that numerous variations and departures may be made to the preferred embodiment without departing from the spirit and scope of the present invention as defined by the appended claims.

We claim:

1. Apparatus for measuring impact received by fragile or delicate articles during bulk processing or handling and displaying the resulting data, comprising in combination an impact measuring module having the approximate configuration of a selected article or variety of vegetable or fruit;

said impact measuring module comprising an electrical power source, impact measuring means for movement experienced by the module and for generating in response thereto an electrical impulse, wireless data transmitting means for transmitting said impulses, and an electronic circuit linking the power source, impact measuring and data transmitting means;

and a receiving unit for positioning remote from the impact measuring module, the receiving unit comprising an electrical power source, data receiving means for receiving the transmitted impulses, data display means, and an electrical circuit linking the foregoing, said receiving unit for receiving and processing on a real time basis data detected and transmitted said impact measuring module.

2. Apparatus as in claim 1, wherein said impact measuring means comprises an accelerometer.

3. Apparatus as in claim 2, wherein said accelerometer comprises a triaxial accelerometer.

4. Apparatus as in claim 1, wherein said receiving unit further comprises data recording means for recording and storing data received by the receiving unit.

5. Apparatus as in claim 4, wherein said data recording means comprises a random access memory chip.

6. Apparatus as in claim 4, wherein said receiving unit further comprises data downloading means for downloading data stored by said recording means into a computer.

7. Apparatus as in claim 4, wherein said receiving unit further comprises an event marker means for recording the occurrence of a specific event in said recording means.

8. Apparatus as in claim 1, wherein said data transmitting and receiving means operate at radio frequencies.

9. Apparatus as claimed in claim 1, wherein said module has the approximate configuration and weight of an average potato.

10. Apparatus as in claim 1, wherein said module has the approximate configuration and weight of an average apple.

11. Apparatus as in claim 1, wherein said module has the approximate configuration and weight of an average orange.

12. Apparatus as in claim 1, wherein said module has the approximate configuration and weight of an average tomato.

13. A method for measuring impact received by selected fragile or delicate articles during bulk processing or handling, and for displaying the resulting data, comprising:

providing an impact measuring module comprising an electrical power source, impact measuring means for measuring movement experienced by the module and for generating in response thereto electrical impulses, wireless data transmitting means for transmitting said impulses and an electronic circuit linking the power source the impact measuring means and the data transmitting means;

positioning said module amongst selected articles having a size, configuration and weight generally similar to the module;

measuring movement of said module communicated to said module by movement of said selected articles, said movement measured by means of said impact measuring means;

providing receiving unit remote from the module for receiving data transmitted by said module and displaying said data to a user;

transmitting data from said impact measuring means to said receiving unit;

displaying said data with said receiving unit in real time as said module is experiencing said movement.

14. A method as in claim 13 wherein said impact is measured by means of an accelerometer.

15. A method as in claim 13 comprising the further step of recording and storing said data within said receiving unit.

16. A method as in claim 13 comprising the further step of recording simultaneously with said data an event marker.

17. A method as claimed in claim 15 or 16 comprising the further step of downloading said recorded data into a computer for subsequent analysis.

* * * * *

UNITED STATES PATENT AND TRADEMARK OFFICE
CERTIFICATE OF CORRECTION

PATENT NO. : 6,125,686
DATED : October 3, 2000
INVENTOR(S) : Thomas Haan; Wayd McNally It is certified that error appears in the above-identified patent and that said Letters Patent is hereby corrected as shown below:

Title page,
Item [75] Inventors:
The name of the first INVENTOR should read: Tom S. Haan.

Signed and Sealed this

Twentieth Day of November, 2001

Attest:

*Nicholas P. Godici*

NICHOLAS P. GODICI
*Attesting Officer*  *Acting Director of the United States Patent and Trademark Office*